United States Patent [19]

Reiner

[11] Patent Number: 4,979,871

[45] Date of Patent: Dec. 25, 1990

[54] WIND TURBINE

[76] Inventor: Harold E. Reiner, P.O. Box 107, Boston, N.Y. 14025

[21] Appl. No.: 438,582

[22] Filed: Nov. 17, 1989

[51] Int. Cl.$^5$ .......................... F03D 7/00; F03D 3/00
[52] U.S. Cl. ...................................... 415/4.2; 415/4.4; 416/17; 416/111; 416/119
[58] Field of Search .................. 415/2.1, 4.1, 4.2, 4.4, 415/905, 907; 416/111, 119, 9, 17; 290/44, 55; 417/334, 336

[56] References Cited

U.S. PATENT DOCUMENTS

| | | | |
|---|---|---|---|
| 503,048 | 8/1893 | Jacobs | 417/334 |
| 987,645 | 3/1911 | O'Toole | 416/17 |
| 1,397,031 | 11/1921 | Boston | 415/4.1 |
| 4,134,707 | 1/1979 | Ewers | 290/55 |
| 4,303,835 | 12/1981 | Bair | 290/55 |
| 4,441,858 | 4/1984 | Lew | 416/17 |
| 4,449,053 | 5/1984 | Kutcher | 290/44 |
| 4,494,007 | 1/1985 | Gaston | 290/44 |
| 4,776,762 | 11/1988 | Blowers, Sr. | 416/119 |
| 4,792,700 | 12/1988 | Ammons | 290/55 |

FOREIGN PATENT DOCUMENTS

| | | | |
|---|---|---|---|
| 0132471 | 10/1981 | Japan | 416/17 |
| 336642 | 10/1930 | United Kingdom | 416/111 |

Primary Examiner—Edward K. Look
Assistant Examiner—Hoang Nguyen
Attorney, Agent, or Firm—Sommer, Oliverio & Sommer

[57] ABSTRACT

An improved vertical axis wind turbine is disclosed. The wind turbine in accordance with one embodiment, does not include a support tower but instead includes a bearing support for mounting a torque tube rotatably connected to blades, the bearing support being secured to ground by a plurality of guy cables. The torque tube may comprise a plurality of tube sections including an intermediate bearing and additional guy cables for supporting the torque tube to the ground in a vertical orientation. In another embodiment of the present invention, control means are disclosed for independently controlling the pitch of respective wind turbine blades in response to relative wind direction.

19 Claims, 5 Drawing Sheets

WIND TURBINE

TECHNICAL FIELD

The present invention relates generally to wind turbines, and, more particularly, to an improved wind turbine having vertically oriented blades.

BACKGROUND ART

Conventional wind turbines are typically supported by a relatively complex and expensive support tower for placing wind turbine blades at high positions relative to the ground and for accommodating reaction loads due to freestream wind forces over the wind-turbine blades. And, conventional wind turbines can operate at relatively high rotational speeds which requires precision fabrication, balancing and complex support and controlling structures.

Furthermore, power is also conventionally obtained from the wind turbine at the top of the support tower. This requires the support tower to additionally accommodate the weight of the power take-off means, such as a generator, and makes maintenance difficult.

One type of conventional wind turbine includes vertically oriented blades mounted to a hub which rotates in a plane parallel to the ground. In such an arrangement, the rotating hub has a leeward side wherein the blades move away from the wind and the freestream airflow pushes, or lifts, the wind turbine blades and is in the same direction therewith. The hub also has a windward side wherein the blades are moving toward or against the wind in a direction opposition to the direction of the freestream wind. In order for such a wind turbine to operate, the pitch of the blade, which is the angular position of the blade relative to the freestream airflow, must be continuously changed for providing lift on the leeward side of the hub and minimum drag on the windward side of the hub.

Conventional wind turbines include a central control vane responsive to freestream wind direction which is disposed generally parallel thereto and operatively connected to the blades for continuously changing the pitch thereof as the blades rotate with the hub about a central axis. However, a central control vane senses freestream airflow direction and does not account for either the relative, or apparent, wind direction experienced by each of the rotating blades, or any turbulence which may be acting upon any of the blades in operation.

OBJECTS OF THE INVENTION

Accordingly, one object of the present invention is to provide a new and improved wind turbine.

Another object of the present invention is to provide a wind turbine having low rpm and high torque.

Another object of the present invention is to provide a wind turbine which is relatively less complex and therefore relatively inexpensive to fabricate.

Another object of the present invention is to provide a wind turbine which does not require a supporting tower.

Another object of the present invention is to provide a wind turbine responsive to relative wind direction.

Another object of the present invention is to provide a wind turbine with a power take-off disposed adjacent to the ground.

Another object of the present invention is to provide a wind turbine which is self-starting.

DISCLOSURE OF THE INVENTION

A wind turbine in accordance with a preferred embodiment of the present invention includes a base secured to ground, torque generating means responsive to wind including a blade disposed radially outwardly from a rotatable hub, and a torque tube extending from the hub to the base. In a preferred embodiment, the torque tube is supported by bearing supports connected to the ground by a plurality of guy cables. In another embodiment of the present invention, pitch of the wind turbine blades is controlled by a control means responsive to relative wind over the blade as the blade rotates with the hub.

BRIEF DESCRIPTION OF THE DRAWINGS

The novel features believed characteristic of the invention are set forth and differentiated in the claims. The invention, in accordance with preferred, exemplary embodiments, together with further objects and advantages thereof, is more particularly described in the following detailed description taken in conjunction with the accompanying drawing in which:

MODE(S) OF CARRYING OUT THE INVENTION

Figures 1, 4:
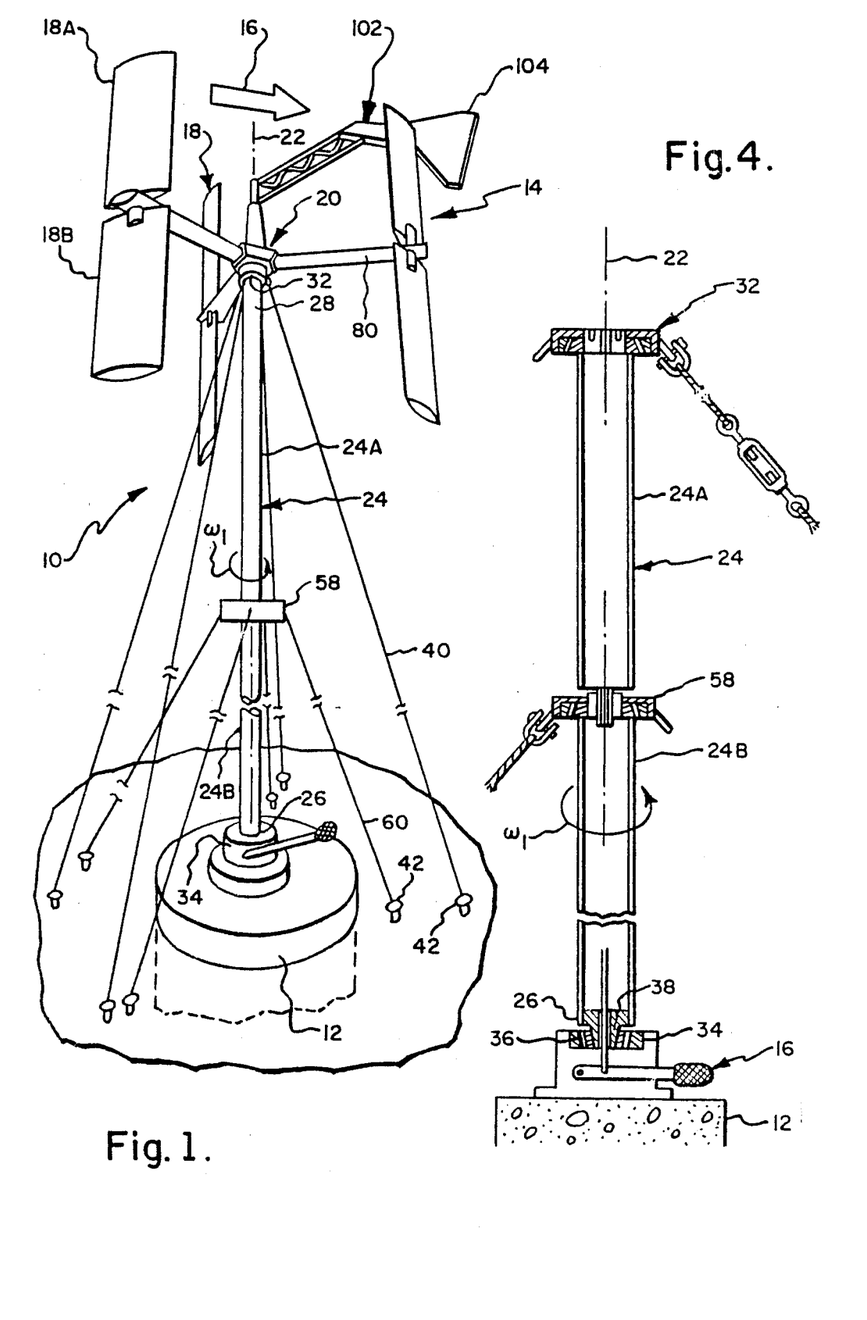
FIG. 1 is a partly schematic, perspective view of a wind turbine in accordance with an exemplary embodiment of the present invention.
FIG. 4 is a side, partly sectional view of a torque tube and support used in the wind turbine illustrated in FIG. 1.

Illustrated in FIG. 1 is a wind turbine 10 in accordance with a preferred, exemplary embodiment of the present invention. The wind turbine 10 includes a base 12, such as a concrete foundation, suitably secured to the ground. Turbine 10 further includes torque generating means 14 responsive to freestream wind 16 which includes a plurality of blades 18 disposed radially outwardly from a hub 20 as additionally illustrated in FIG. 2. The blades 18 are affective for rotating the hub 20 about a longitudinal centerline axis 22 at a rotational speed of $\omega_1$, which as illustrated is in a counterclockwise direction.

Rotation of the hub 20 by the wind 16 acting over the blades 18 generates relatively high torque at relatively low speed $\omega_1$ preferably up to about 20 rpm. A torque tube 24 has a lower end 26 suitably joined to the base 12, and an upper end 28 fixedly attached to the hub 12 for rotation therewith. The tube upper end 28 includes an annular flange 30 integral with the tube 24 and suitably fixedly connected to the hub 20, by bolting, for example as illustrated in FIG. 3.

Figure 3:
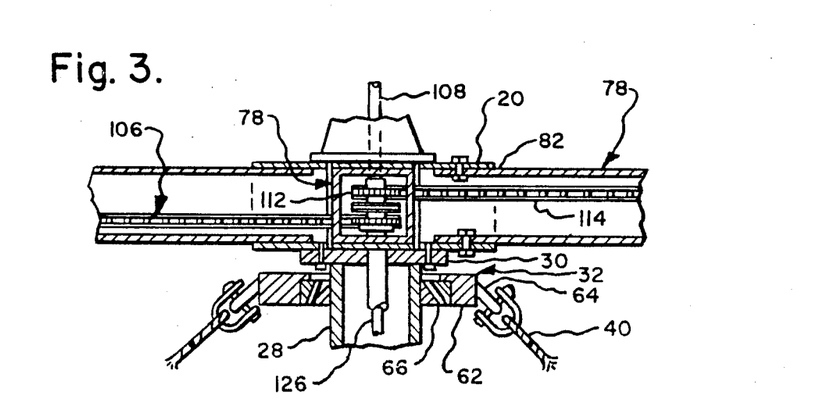
FIG. 3 is a sectional view of a portion of the wind turbine illustrated in FIG. 2 taken along line 3—3.

The turbine 10 further includes a first bearing support 32, as illustrated in FIGS. 1, 3 and 4, which is rotatably connected to the torque tube upper end 28 for allowing the torque tube 24 to rotate relative to the first bearing support 32. A second bearing support 34 is suitably disposed on the base 12, and as illustrated in FIGS. 1 and 4 and is rotatably connected to the tube lower end 26 to allow the tube 24 to rotate relative to the second bearing support 34. As illustrated in FIG. 4, the second bearing support 34 may comprise a conventional tapered roller bearing 36 suitably connected in the bearing support 34 and effective for allowing the tube 24 to rotate about the centerline axis 22 and for supporting reaction thrust loads from the tube 24 transmitted to the base 12. The torque tube lower end 26 preferably has a conical end 38 which is supported in a complementary aperture in the tapered bearing 36.

A plurality of first guy cables 40 are conventionally fixedly connected to the first bearing support 32, and to the ground by conventional anchors 42 at a distance from the base 12 for maintaining the torque tube 24 in a vertical position relative to the ground. As illustrated in FIG. 1, four equally spaced guy cables 40 are used.

Figures 5, 6, 7, 8:
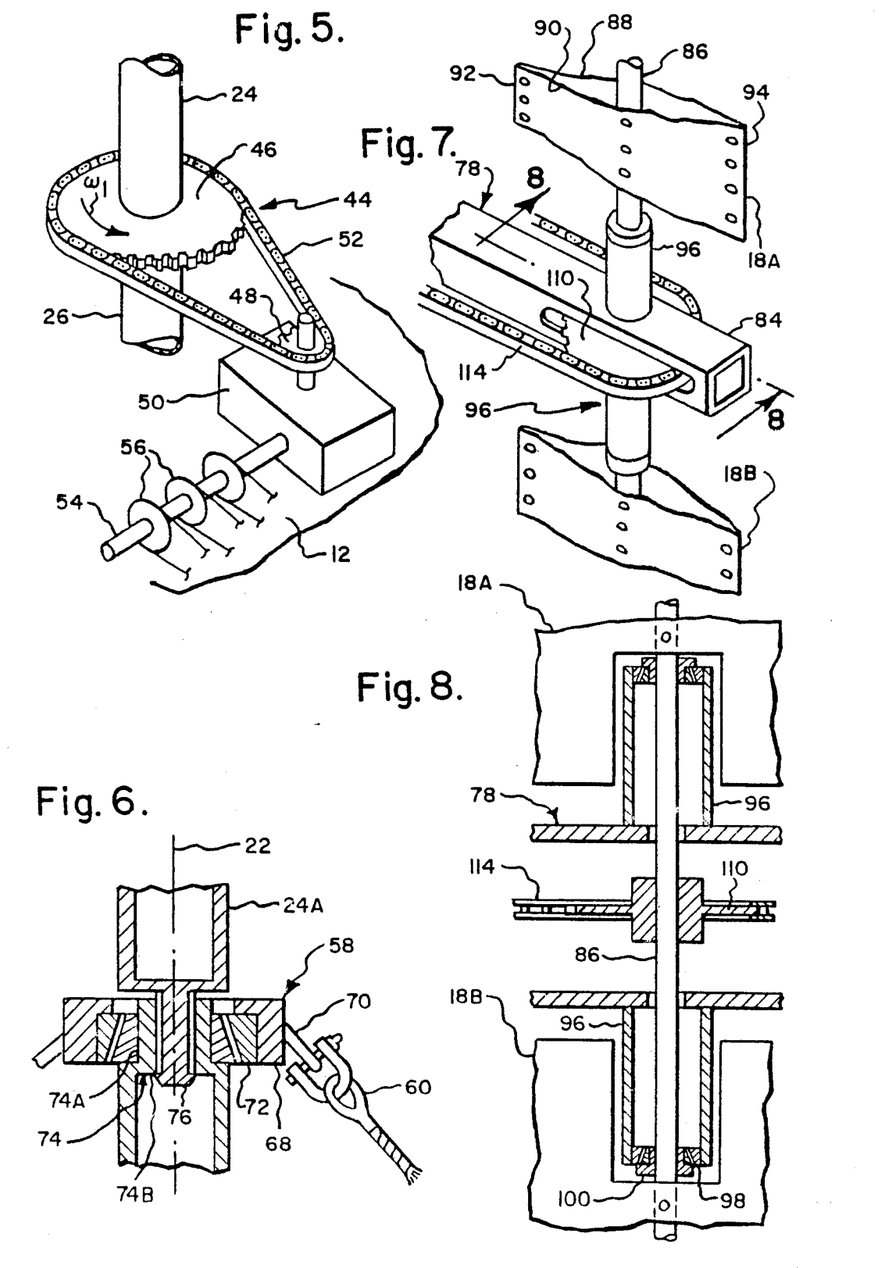
FIG. 5 is a schematic representation of power take-off means utilized in the wind turbine illustrated in FIG. 1.
FIG. 6 is an enlarged, sectional view of an intermediate bearing support utilized in the wind turbine illustrated in FIG. 1.
FIG. 7 is an enlarged, partly sectional, perspective view of a portion of the wind turbine illustrated in FIG. 1 illustrating the blades 18 mounted to an end of a power arm.
FIG. 8 is an enlarged, partly sectional view of the blade mounts illustrated in FIG. 7.

Conventional power take-off means 44, as illustrated in FIG. 5 are disposed on the base 12 and operatively connected to torque tube 24. By providing the power take-off means 44 on the base 12, it is readily accessible, and therefore, additionally eliminates the need for a complex support tower which would otherwise be required.

Power take-off means 44 may include a pinion sprocket 46 conventionally fixedly secured to the power tube 24, and an input sprocket 48 of a conventional speed box 50, for increasing or decreasing input speed as desired. A conventional chain 52 operatively connects the pinion sprocket 46 to the input sprocket 48. The speed box 50 includes an output shaft 54 operatively connected to the input sproket 48, which output shaft 54 may have several output pulleys or sprockets 56 for powering devices such as a water pump or electrical generator not part of the present invention. The power take-off means 44 may be used to control the speed of rotation $\omega_1$ of the torque tube 24 by varying the applied load. However, other conventional means may be used to control the speed $\omega_1$ of the torque tube 24.

A significant feature in accordance with one embodiment of the present invention, is the use of only the torque tube 24 without a supporting tower for supporting the torque generating means 14. By mounting the torque tube 24 in the first bearing support 32 and in the second bearing support 34, and maintaining the torque tube 24 in a vertical position by using the first guy cables 40, a relatively simple and inexpensive structure is created for supporting the torque generating means 14 and providing torque from the rotating blades 18 directly to the base 12 from the torque tube 24.

In accordance with another embodiment of the present invention, the torque tube 24 may comprise two or more sections, for example an upper torque tube section 24A and a lower torque tube section 24B as illustrated in FIGS. 1 and 4. The torque tube sections 24A and 24B are joined to each other at an intermediate bearing support 58 which is rotatably connected to the two torque tube sections 24A and 24B. The intermediate bearing support 58 is conventionally connected to the ground by a second plurality of guy cables 60 attached to additional ones of the anchors 42 secured to the ground. In the exemplary embodiment illustrated in FIG. 1, four guy cables 60 equally spaced from each other are utilized. The first and second guy cables 40 and 60 are conventionally tensioned, using turnbuckles for example, for maintaining both the torque tube sections 24A and 24B in a vertical position aligned coaxially with the centerline axis 22.

FIGS. 3 and 4 illustrate in more particularity the details of the first bearing support 32. The support 32 includes an annular housing 62 having a plurality of conventional, integral lugs 64 to which are conventionally attached the first guy cables 40. A conventional tapered roller bearing 66 is mounted in the housing 62 and coaxially receives and supports the torque tube upper end 28.

Illustrated in FIGS. 4 and 6 are the details of the intermediate bearing support 58. The intermediate bearing support 58 includes a second annular housing 68 and a plurality of conventional second lugs 70 which are conventionally secured to the second guy cables 60. Suitably secured in the housing 68 is a second conventional tapered roller bearing 72 which supports an upper end 74 of the torque tube lower section 24b which is coaxial with the centerline axis 22. The upper end 74 has an annular outer surface 74A which is conventionally seated in the second bearing 72, and a conventional inner spline surface 74B which mates with a complementary shaped lower spline end 76 of the torque tube upper second 24A for transmitting torque from the upper second 24A to the lower section 24B through the intermediate bearing support 58.

Figure 2:
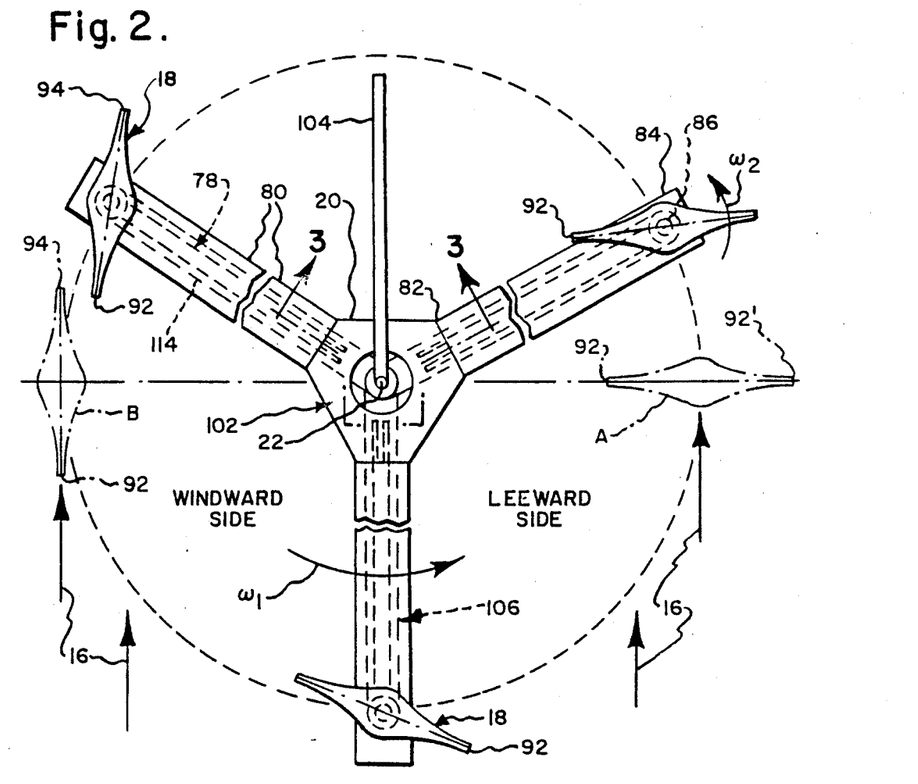
FIG. 2 is a top, partly sectional view of the wind turbine illustrated in FIG. 1.

Referring to FIGS. 1, 2 and 3, the torque generating means 14 in accordance with an exemplary embodiment of the present invention further includes a plurality of generally square, hollow power arms 78 extending from the hub 20 to the blades 18. As illustrated, three power arms 78 are utilized and are equiangularly spaced from each other at 120° apart. FIG. 3 illustrates the power arms 78 without the aerodynamic fairing 80 thereover as illustrated in FIGS. 1 and 2. The fairing 80 has a streamlined profile for minimizing drag as the hub 20 and power arms 78 rotate in operation. Each of the power arms 78 includes an inner end 82 conventionally fixedly attached to hub 20, by bolting for example. The power arms 78 also include an outer end 84 to which is mounted the blades 18.

FIGS. 1, 7 and 8 illustrate in more particularity the mounting of the blades 18 to the power arm outer end 84. The blades 18 are preferably disposed as a plurality of pairs of blades 18 disposed in a vertical direction parallel to the torque tube 24 and the centerline axis 22. Each blade pair includes an upper blade 18A and a lower blade 18B, and in the embodiment illustrated there are three blade pairs including three upper blades 18A and three lower blades 18B. The upper blade 18A is joined to the lower blade 18B by a blade shaft 86 which is rotatably attached to a respective power arm 78 at the power arm outer end 84. The blades 18 may simply comprise metal sheets forming a first side 88 and a second side 90 suitably secured to the blade shaft 86 by tack welding for example. The blades 18 include a leading edge 92 and a trailing edge 94 both simply formed by tack welding of the first and second sides 88 and 90 to each other.

The blades 18 are rotatably secured to the power arm 78 by disposing the blade shaft 86 perpendicular to the power arm 78 and parallel to the torque tube centerline axis 22. Respective support tubes 96 are fixedly connected to the power arm 78, by welding for example, as illustrated in FIGS. 7 and 8. Tubes 96 include a conventional roller bearing 98 suitable secured to the tube 96 and a conventional elastomeric bushing 100 compressed between an inner race of the bearing 98 and an outer surface of the shaft 86 for supporting the shaft 86. The tubes 96 are disposed on upper and lower sides of the power arm 78 and the blade shaft 86 extends through the tubes 96 for supporting the blades 18 to the power arm 78.

The torque generating means 14 further includes pitch control means 102, various features of which are illustrated in FIGS. 1,2,3,7,8 and 9. Pitch control means 102 is effective for controlling the angular position, or pitch, of the blades 18 relative to the direction of the freestream wind 16 for allowing the blade pairs to rotate the hub 20 upon application of the wind 16. The pitch control means 102 includes a conventional control vane 104 rotatably connected to the hub 20 so that it remains generally parallel to the wind direction 16 as the hub 20 is caused to rotate by the wind. Means 106 for connecting the control vane 104 to the blade pairs 18 are provided to change pitch of the blade pairs 18 as the blade pairs 18 rotate with the hub 20. The connecting means 106 changes blade pitch to feather each of the blade pairs on a windward wind side of the hub 20, as illustrated in FIG. 2, to minimize drag due to the blade pair 18, and to load the blade pair on a leeward side of the hub 20 to maximize lift, or push by the wind 16, on the blade pair 18 for rotating the hub 20.

Figures 9, 10, 11:
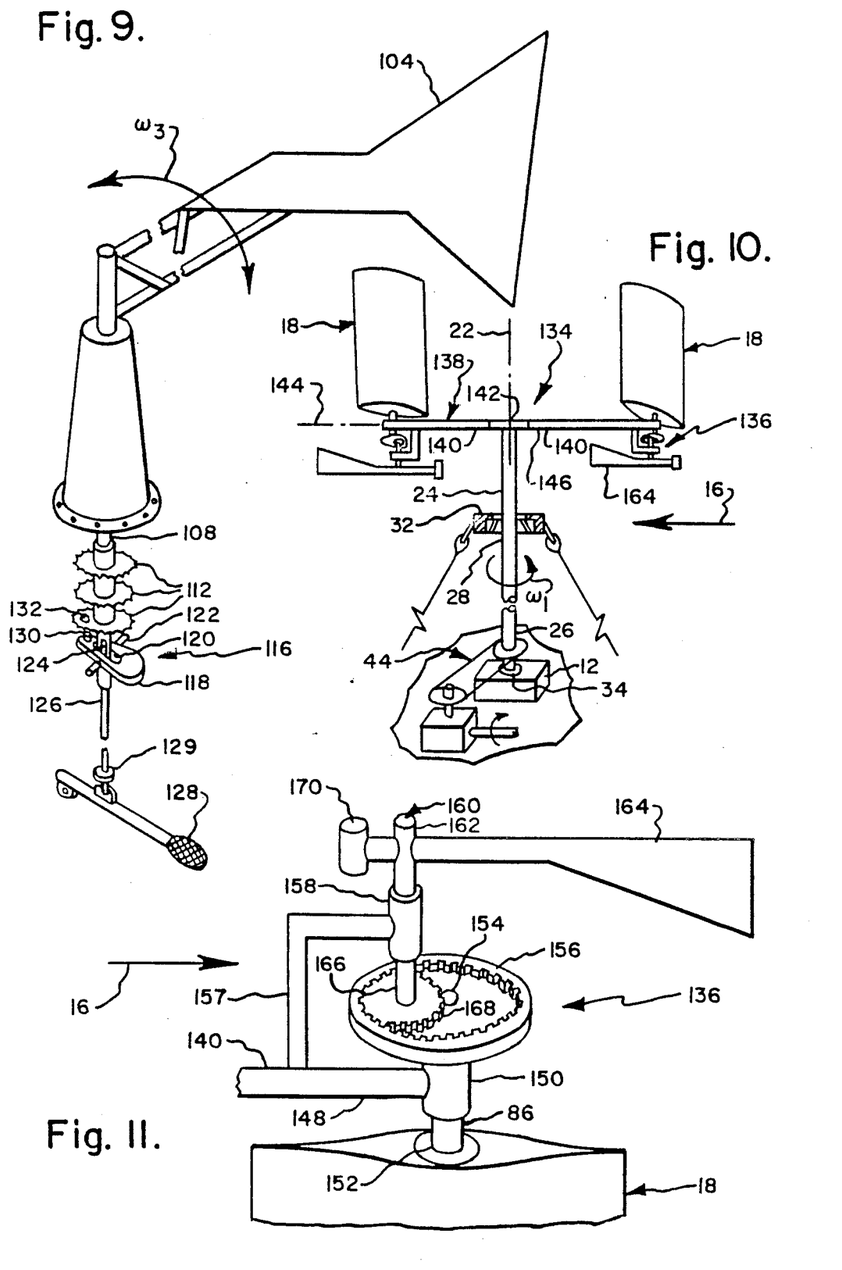
FIG. 9 is an exploded, perspective view of a control vane and shaft assembly utilized in the wind turbine illustrated in FIG. 1.
FIG. 10 is a partly schematic, perspective view of a wind turbine in accordance with another embodiment of the present invention.
FIG. 11 is a perspective view of control means used for controlling pitch of the blades illustrated in FIG. 10.

As illustrated in FIGS. 3,7 and 9, the control vane 104 is connected to a control shaft 108 and the connecting means 106 includes a respective first sprocket 110 fixedly attached on each of the blade shafts 86, and a respective second sprocket 112 fixedly connected on the control shaft 108. The three second sprockets 112 are fixedly connected to each other. Since three blade pairs 18 are utilized in the preferred embodiment, three second sprockets 112 are disposed on the control shaft 108. The connecting means 106 further includes three respective chains 114 joining the first sprockets 110 and the second sprockets 112 to each other to allow the blade pair 18 to rotate with the hub 20 and to change pitch in response to position of the control vane 104.

In the preferred embodiment, the first sprocket 110 has a first diameter and the second sprocket 112 has a second diameter which is twice as large as the first sprocket diameter so that each of the blade pairs 18 rotates one-half revolution about its respective blade shaft 86 upon each rotation of the hub 20 about the centerline axis 22.

As illustrated in FIGS. 4 and 9, means 116 are provided for selectively engaging and disengaging the control vane 104 from the blade pairs 18. The engaging means 116 includes the three second sprockets 112 being slidingly disposed on the control shaft 108 and a locking member 118 connected to the control shaft 108 for rotation therewith. In the exemplary embodiment, the locking member 118 has a central opening 120 disposed around the control shaft 108 and a retention pin 122 extends through an elongate slot 124 in the control shaft 108 and through the locking member 118. The pin 122 is connected to an inner shaft 126 disposed within the control shaft 108 so that the inner shaft 126 rotates with the control shaft 108. The inner shaft 126 is suitably connected to a lever 128 at the base 12 of the wind turbine 10 by a swivel joint 129 to prevent rotation of the shaft 126 from rotating the lever 128. The locking member 118 further includes a pin 130 which is sized for fitting a complementary hole 132 in a lower one of the three second sprockets 112.

When the lever 128 is placed in an upward position, the pin 130 on the locking member 118 engages the hole 132 in the second sprocket 112 which then causes the three second sprockets 112 which are fixedly connected to each other to rotate with the control shaft 108 as the control vane 104 rotates ($\omega_3$) to control the pitch of the blades 18 for rotating the hub 12. When the lever 128 is disposed in a lower position which disengages the locking member 118 away from the second sprocket 112 for removing the pin 130 from the hole 132, the three second sprockets 112 are freed from moving with the control shaft 108 and do not rotate, and therefore pitch of the blades 18 is not controlled and the hub 12 will cease to rotate.

FIGS. 2,3 and 9 illustrate more clearly the operation of the pitch control means 102. Each of the blade pairs 18 is initially positioned relative to the power arm 78 upon assembly so that when the blade 18 is placed in a maximum lift, or push, position with the freestream airflow normal thereto as illustrated in the 3 o'clock position A in FIG. 2, the blade 18 is so oriented and the control vane 104 is in a position parallel to the freestream airflow 16. This may be simply accomplished by placing the blade 18 with an angular position, or pitch, normal to the airflow 16 and the control vane 104 in a position parallel to a reference freestream airflow direction 16 and then connecting the chain 114 between the first and second sprockets 110 and 112. This step is repeated for each of the blade pairs 18 on each of the power arms 78.

With the second sprockets 112 being twice as large as the first sprockets 110, as the hub 20 rotates in a counterclockwise direction, as illustrated in FIG. 2, and with the control vane 104 disposed in the direction illustrated parallel to the freestream wind 16, the blade 18 will be caused to rotate counterclockwise about its shaft 86 at a rotational speed of $\omega_2$ as the hub 20 rotates about the centerline axis 22. When the blade 18 is positioned on the windward side of the hub 20, i.e., position B at a 9 o'clock relative to the freestream wind 16, the blade 18 is feathered in a position providing minimum drag from the airflow 16 which flows over the blade 18 from the leading edge 92 to the trailing edge 94. As the blade 18 continues to be rotated with the hub 20 in a counterclockwise direction relative to the centerline 22, the blade 18 continues to rotate on its shaft 86. When the blade 18 returns to its original 3 o'clock position A as illustrated in FIG. 2, after one revolution of the hub 20, the blade 18 has rotated one-half revolution about its shaft 86 and its leading edge 92 has been rotated 180° as indicated by leading edge 92', as illustrated in FIG. 2.

Accordingly, as the direction of the wind 16 changes, the control vane 104 remains parallel to the wind direction 16 thusly changing the pitch of the blades 18 relative to the freestream wind 16. This continuously positions the blades 18 so that as they rotate with the hub 20 about the centerline axis 22, the wind 16 is always positioned normal to the blade 18 at a respective position A as illustrated in FIG. 2. However, the pitch positions of the three blade pairs 18 are identically controlled by the control vane 104. In accordance with another embodiment of the present invention, control means responsive to relative wind, instead of the freestream, absolute wind 16, for controlling the pitch of the blade pairs 18 is provided.

More specifically, illustrated in FIG. 10 is a second wind turbine 134 including two, identical, independently operable control means 136 operatively connected to respective blades 18. The wind turbine 134 is generally similar to the wind turbine 10 illustrated in FIG. 1 and includes the base 12 secured to the ground, the torque tube 24 extending from the blades 18 to the base 12, a first bearing support 32 rotatably connected to the torque tube upper end 28, and the second bearing support 34 rotatably connected to the torque tube lower end 26. The conventional power take-off means 44 is operatively connected to the torque tube lower end 26.

In the embodiment illustrated in FIG. 10, torque generating means 138 includes two tubular power arms 140 extending radially outwardly from a T-shaped hub 142 fixedly connected to the torque tube upper end 28. The power arms 140 are colinear with each other about a transverse axis 144 which is disposed perpendicularly to the centerline axis 22 of the torque tube 24. Each power arm 140 includes an inner end 146 fixedly connected to the hub 142 and an outer end 148 rotatably supporting the blade 18.

More specifically, and as illustrated in FIG. 11 the blade 18 includes the blade shaft 86 which is rotatably secured to the power arm outer end 148 through a conventional bushing 150 fixedly connected to the power arm outer end 148. The shaft 86 is disposed parallel to the centerline axis 22 of the torque 24 and includes a first end 152 disposed on one side of the bushing 150 which is attached to the blade 18, and a second end 154 disposed on an opposite side of the bushing 150 to which is fixedly attached a conventional ring, or internal gear 156. Also fixedly connected to the power arm outer end 148 is a generally "L" shaped support 157 having a conventional second bushing 158 fixedly connected thereto and disposed parallel to both the blade shaft 86 and the centerline axis 22. Suitably rotatably secured in the bushing 158 is a control shaft 160 having a first end 162 fixedly secured to a control vane 164 disposed generally perpendicularly to the control shaft 160. The control shaft 160 further includes a second end 166 disposed on an opposite side of the bushing 158 to which is fixedly attached a pinion gear 168 disposed perpendicularly to the control shaft 160 and operatively connected to the ring gear 156 so that pitch of the blade 18 changes as the hub 142 and power arm 140 rotate. The control vane 164 preferably includes a counter weight 170 for balancing the control vane 164.

The control vane 164 is rotatably connected to the power arm 140 through the bushing 158 so that as the blade 18 causes the hub 142 and the power arm 140 to rotate about the centerline axis 22 due to the freestream wind 16 thereover, the control vane 164 continuously changes pitch of the blade 18 as the blade 18 rotates with the hub 142. In the preferred embodiment illustrated in FIG. 11, the pinion gear 168 has a diameter and the ring gear 156 has a diameter twice as large as the pinion gear diameter. In other words, the ring gear 156 has twice as many gear teeth as the pinion gear 168 has.

Figure 12:
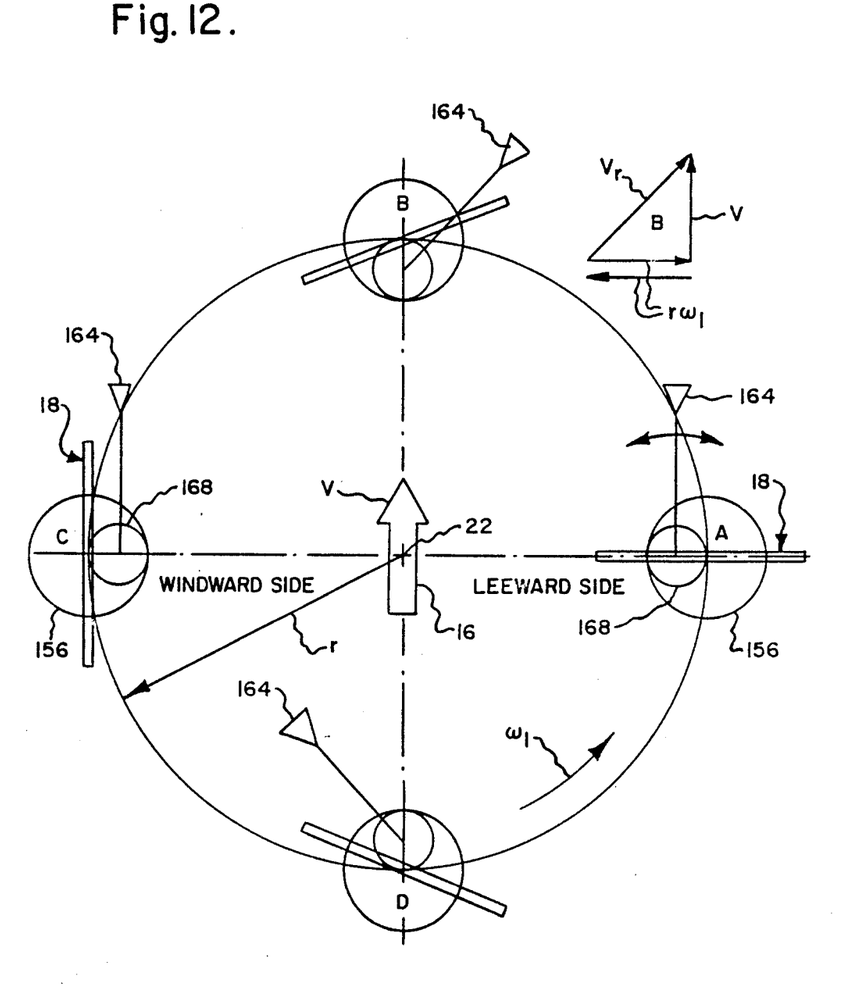
FIG. 12 is a schematic representation of the wind turbine illustrated in FIG. 10 showing relative position of control vanes, blades, absolute freestream wind direction and relative wind direction.

Referring to both FIGS. 11 and 12, a preferred assembly of the control means 136 is disclosed. More specifically, FIG. 12 illustrates a first pitch position of the blade 18 at 3 o'clock labeled A of maximum lift, or push, from the freestream wind 16 disposed perpendicularly thereto and a second pitch position of the blade 18 of minimum drag indicated as 9 o'clock position C wherein the blade 18 is disposed parallel to the freestream wind 16 for obtaining minimum drag. The control vane 164 is initially positioned during assembly parallel to a reference freestream wind direction also indicated as 16 in FIG. 12, with the control vane 164 extending in a downstream direction parallel thereto. The blade 18 is assembled so that the pinion gear 168 and the ring gear 156 are operatively connected to each other to position the blade 18 normal to the referenced wind direction 16 and also normal to the position of the control vane 164 on the leeward side of the hub 142. In such a position, when the power arm 140 rotates 180° counterclockwise to the windward side position illustrated at position C, the control vane 164 will continue to be parallel to the freestream wind direction 16 but the blade 18 has been rotated counterclockwise to the new position C parallel to the freestream wind direction 16. Accordingly, the control vane 164 is positioned parallel to the freestream wind direction 16 both when the blade 18 is in the first position A on the leeward side of the hub 142 and in the second position C on the windward side of the hub 142. The blade 18 is also positioned at pitch positions intermediate those of the first and second pitch positions A and C as the blade 18 rotates with the hub 142 from the leeward side to the windward side and back again to the leeward side in a counterclockwise direction from position A to B to C to D and back to position A.

As illustrated in FIGS. 10 and 12, the wind turbine 134 includes two blades 18 identically positionable relative to the freestream wind 16 as above described thus providing for self-starting in the freestream wind 16. More specifically, and referring to FIG. 12, position A is analogous to an initial position of one of the blades 18, and position C is analogous to another initial position of the other blade 18. When the wind starts blowing in the direction indicated by the arrow 16, it is apparent that the leeward side blade 18 will be caused to rotate about the centerline 22 in a counterclockwise direction. Since the windward side blade 18 at position C is disposed parallel to the wind direction 16, minimum drag is provided which allows the hub 142 to be rotated about the centerline 22 for self-starting.

A significant feature according to this embodiment of the present invention, including the independently controllable control means 136 associated with each blade 18, is that in all positions including the intermediate positions of the blade 18 between the leeward side and the windward side of the hub 142, the control means 136 is affective for responding to relative, or apparent wind direction which is different than the freestream wind direction 16. For example, FIG. 12 illustrates a vector diagram associated with the position B of the blade 18 at a 12 o'clock position. The velocity of freestream airflow 16 is represented by the vector V. The rotational velocity component of the blade 18 about the centerline 22 is represented by the vector $r\omega_1$, which is a tangential velocity due to rotation of the blade 18 about a radius r, which is the radius of the blade shaft 86 from the centerline axis 22. Since the blade 18 is rotating about the radius r, it senses a component of wind opposite to that rotational velocity component of the same magnitude $r\omega_1$. The vector addition of the absolute freestream wind velocity V and the tangential wind velocity component $r\omega_1$ is represented by the resultant vector $V_r$. The control vane 164 will position itself not parallel to solely the freestream wind 16 (vector V) but parallel to the relative, or apparent, resultant vector $V_r$ as illustrated at position B in FIG. 12.

Accordingly, the control means 136 is affective for positioning each blade 18 in response to relative wind direction for improving performance of the wind turbine 134.

While there have been described herein what are considered to be preferred embodiments of the present invention, other modifications of the invention shall be apparent to those skilled in the arts from the teachings herein, and it is, therefore, desired to be secured in the appended claims, all such modifications as fall within the true spirit and scope of the invention.

More specifically, and for example only, although a particular form of the blade 18 has been illustrated, other blades 18 effective for use in a vertical wind turbine may be used, such as, for example, a conventional Savonius blade. Furthermore, any number of blades 18 may be utilized around the circumference of a rotating hub in a wind turbine in accordance with the present invention. The blades 18 may be utilized either singly as illustrated in FIG. 10 or in blade pairs as illustrated in FIG. 1. Also, the pitch of the blades 18 may be selected for operating the wind in a clockwise direction, if desired.

Furthermore, the fairing 80 could be configured so that it has a streamlined profile on the windward side and a flat profile on the leeward side to provide additional torque during operation.

Accordingly, what is desired to be secured by Letters Patent of the United States is the invention as recited and differentiated in the following claims:

1. A wind turbine comprising:
    a base secured to ground;
    torque generating means responsive to wind including a plurality of blades disposed radially outwardly from a rotatable hub, said blades being effective for rotating said hub upon application of wind over said blades for generating torque;
    a torque tube having a lower end, and an upper end fixedly attached to said hub for rotation therewith;
    a first bearing support rotatably connected to said torque tube upper end;
    a second bearing support disposed on said base and rotatably connected to said torque tube lower end;
    a plurality of guy cables fixedly connected to said first bearing support and to said ground at a distance from said base for maintaining said torque tube in a vertical position; and
    power take-off means disposed on said base and operatively connected to said torque tube for obtaining power from said torque generating means transmitted through said torque tube.

2. A wind turbine according to claim 1 wherein said torque tube comprises two sections joined to each other at an intermediate bearing support rotatably connected to said two torque tube sections, said intermediate bearing support being connected to said ground by a second plurality of guy cables for maintaining both said torque tube sections in a vertical position.

3. A wind turbine according to claim 1 wherein said torque generating means further comprises:
    a plurality of power arms extending radially outwardly from said hub, each power arm having an outer end, and an inner end fixedly attached to said hub;
    a plurality of pairs of said blades disposed in a vertical direction parallel to said torque tube, each blade pair including an upper blade and a lower blade joined to each other by a blade shaft and rotatably attached to a respective power arm at said power arm outer end; and
    pitch control means for controlling pitch of said blade pairs relative to direction of said wind for allowing said blade pairs to rotate said hub upon application of said wind.

4. A wind turbine according to claim 3 wherein said pitch control means comprises:
    a control vane rotatably connected to said hub so that said control vane remains generally parallel to said wind direction as said hub is caused to rotate by said wind; and
    means connecting said vane to said blade pairs to change said pitch of said blade pairs as said blade pairs rotate with said hub to feather each of said blade pairs on a windward wind side of said hub to minimize drag due to said blade pair and to load said blade pair on a leeward side of said hub to maximize lift of said blade pair for rotating said hub.

5. A wind turbine according to claim 4 wherein said control vane includes a control shaft and said connecting means comprises a respective first sprocket on each of said blade shafts, a respective second sprocket on said control shaft and a chain joining said respective first and second sprockets to allow said blade pairs to rotate with said hub and to change pitch in response to position of said control vane.

6. A wind turbine according to claim 5 wherein said first sprocket has a first diameter and said second sprocket has a second diameter twice as large as said first diameter so that each of said blade pairs rotates one-half revolution about its respective blade shaft upon each rotation of said hub.

7. A wind turbine according to claim 6 wherein said torque generating means further comprises three of said power arms equiangularly spaced from each other about said hub, each of said power arms including a respective one of said blade pairs mounted at a respective one of said power arm outer ends.

8. A wind turbine according to claim 7 further including a spaced pair of blade bearings attached to said power arm outer end for rotatably supporting each of said blade pairs thereto, and an elastomeric bushing disposed between each of said blade bearings and said power arm outer end for damping vibrations.

9. A wind turbine according to claim 5 further including means for selectively engaging said control vane to said blade pairs.

10. A wind turbine according to claim 9 wherein said engaging means comprises:
    said second sprockets being slidingly disposed on said control shaft;
    a locking member connected to said control shaft for rotation therewith; and
    means for selectively engaging said locking member to said second sprockets to cause said second sprockets to rotate with said control shaft when engaged and allowing said second sprockets to rotate freely relative to said control shaft when disengaged.

11. A wind turbine comprising:
a base secured to ground;
torque generating means responsive to wind including a blade disposed radially outwardly from a rotatable hub, said blade being effective to rotate said hub upon application of wind over said blade for generating torque;
a torque tube having a lower end, and an upper end fixedly attached to said hub for rotation therewith;
a first bearing support rotatably connected to said torque tube upper end;
a second bearing support rotatably connected to said torque tube lower end;
said first and second bearing supports being effective for supporting said torque tube to said base;
power take-off means operatively connected to said torque tube for obtaining power from said torque generating means transmitted through said torque tube; and
control means responsive to relative wind for controlling pitch of said blade.

12. A wind turbine according to claim 11 wherein:
said torque generating means further includes a power arm extending radially outwardly from said hub and including an inner end fixedly connected to said hub, and an outer end rotatably supporting said blade; and
said control means further includes a control vane rotatably connected to said power arm outer end and operatively connected to said blade so that as said blade causes said hub to rotate due to wind over said blade, said control vane continuously changes pitch of said blade as said blade rotates with said hub.

13. A wind turbine according to claim 12 wherein said control means further includes a pinion gear fixedly connected to said control vane and a ring gear fixedly connected to said blade, said pinion gear being operatively connected to said ring gear so that pitch of said blade changes as said hub rotates.

14. A wind turbine according to claim 13 wherein said pinion gear has a diameter and said ring gear has a diameter twice as large as said pinion gear diameter.

15. A wind turbine according to claim 13 wherein said blade has a first pitch position of maximum lift and a second pitch position of minimum drag, and said control vane is positionable parallel to freestream wind direction both when said blade is in said first position on a leeward side of said hub and in said second position on a windward of said hub, and said blade being positioned at pitch positions intermediate those of said first and second pitch positions as said blade rotates with said hub from said leeward side to said windward side and back again to said leeward side.

16. A wind turbine according to claim 13 wherein said control vane includes a counterbalance so that said control vane is balanced.

17. A wind turbine according to claim 13 further including:
two of said power arms extending colinearly from said hub;
two of said blades, each blade extending from a respective outer end of said power arm; and
two of said control means, each control means operatively connected to a respective blade and operable independently of each other.

18. A wind turbine according to claim 17 wherein each of said blades has a first pitch position of maximum lift and a second pitch position of minimum drag, and respective ones of said control vanes are positionable parallel to freestream wind direction both when said blade is in said first position on a leeward side of said hub and in said second position on a windward of said hub, and said torque generating means is selfstarting in said freestream wind.

19. A wind turbine according to claim 13 wherein said torque tube comprises two sections joined to each other at an intermediate bearing supporting rotatably connected to said two torque tube sections, said first bearing support being connected to said ground by a first plurality of guy cables, and said intermediate bearing support being connected to said ground by a second plurality of guy cables for maintaining both said torque tube sections in a vertical position.

* * * * *